June 10, 1958 W. E. SOHL 2,838,421
ADHESIVES AND ADHESIVE TAPES
Filed Nov. 28, 1956

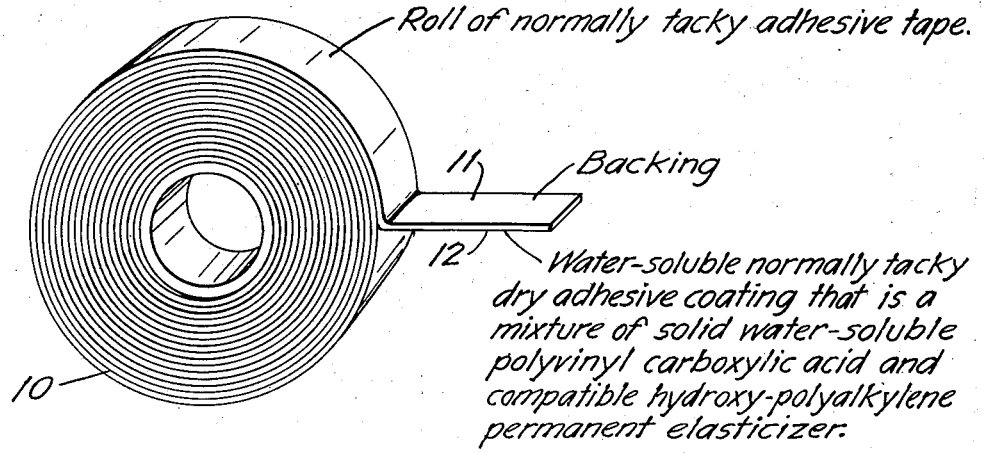

FIG. 1 — Roll of normally tacky adhesive tape. Backing (11). Water-soluble normally tacky dry adhesive coating that is a mixture of solid water-soluble polyvinyl carboxylic acid and compatible hydroxy-polyalkylene permanent elasticizer. (10, 12)

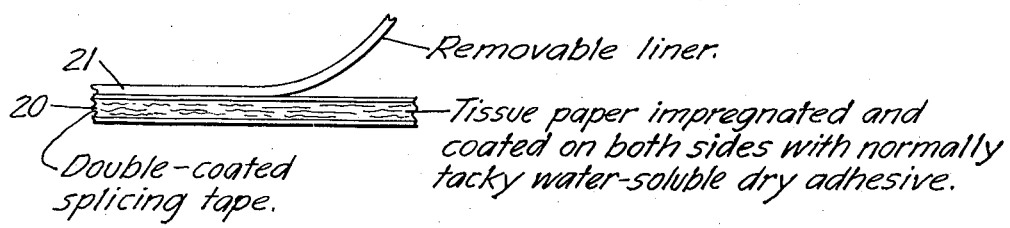

FIG. 2 — Removable liner (21). Tissue paper impregnated and coated on both sides with normally tacky water-soluble dry adhesive (20). Double-coated splicing tape.

INVENTOR
WILLIAM E. SOHL
Carpenter, Abbott, Coulter + Kinney
ATTORNEYS

United States Patent Office 2,838,421
Patented June 10, 1958

2,838,421

ADHESIVES AND ADHESIVE TAPES

William E. Sohl, Birchwood, Minn., assignor to Minnesota Mining and Manufacturing Company, St. Paul, Minn., a corporation of Delaware Application November 28, 1956, Serial No. 624,723

11 Claims. (Cl. 117—122)

This application is a continuation-in-part of my copending application Serial No. 513,573, filed June 6, 1955 (now abandoned).

This invention relates to a novel adhesive tape characterized by having a novel water-soluble adhesive coating that is aggressively and normally tacky and hence does not require activation by water, solvents or heat at the time of use. The adhesive adheres tenaciously with a strong holding force when the tape is pressed against objects having a hydrophilic surface, such as paper, cloth, glass, metal and wood, without the need of more than finger or hand pressure. The invention includes the novel adhesive, per se, as well as novel adhesive tapes embodying it.

The adhesive is water soluble. It is insoluble in and is not swelled by gasoline, oils and hydrocarbon solvents. It adheres to damp or moist surfaces but not to oily surfaces. It appears to be only slightly tacky when tested by touching with the fingers since these normally have a film of oil on the surface of the skin. However, it is properly termed a normally tacky type of adhesive since it sticks upon contact with a variety of common materials, as noted above.

The present type of adhesive tape is fundamentally different in kind from the well-known "pressure-sensitive" adhesive tapes, which have a water-insoluble rubber-resin type of adhesive coating that is permanently and aggressively tacky. The latter type of adhesive is strongly tacky when touched with the fingers. It is water-insoluble and hydrophobic and does not adhere to damp or moist surfaces. The ordinary types are soluble in and swelled by gasoline, oils and hydrocarbon solvents, and in fact are commonly coated in solution in a hydrocarbon solvent, such as heptane.

Despite the fact that it is soluble in water, the adhesive coating of the present tape retains its cohesive and tacky state when exposed either to dry or humid atmospheric conditions. It does not dry out and lose tack even in an anhydrous atmosphere, nor does it become soft and pasty even in a highly humid atmosphere. Adhesives compounded of glue and glycerine, and the like, have long been known which retain a tacky state when exposed to air having a narrow intermediate humidity range, but it is impossible to compound an adhesive of that type which is both tacky and firm over a wide humidity range, or at very low or high humidities.

The present adhesive retains adequate tackiness and internal (cohesive) strength even when exposed for a week or more at humidities in the range of 0 to 90% relative humidity.

This is a very valuable feature inasmuch as the adhesive tapes may be subjected during manufacture, shipment, storage and use to humidity conditions which vary from very low to very high in different localities and seasons. The problem is not fully solved by employing sealed containers since the adhesive tape upon removal is generally exposed to the atmosphere for an appreciable period and sensitivity to variations in atmospheric conditions is undesirable.

So far as I have been able to determine, no previously known adhesive tape has had the combination of properties mentioned above in characterizing my product, and I believe that it is broadly unique.

Illustrative adhesive tapes of this invention are shown in the accompanying drawing wherein:

Fig. 1 is a diagram of a roll of normally tacky adhesive tape 10 comprised of a backing 11 coated with a water-soluble normally tacky dry adhesive coating 12 formulated as hereinafter described.

Fig. 2 is an edgewise diagram of a double-coated splicing tape 20 comprised of a porous tissue paper that is impregnated and coated on both sides with a normally tacky water-soluble dry adhesive formulated in accord with this invention, and which is provided on one side with a removable liner 21 to permit of unwinding from rolls and handling during application, as in splicing paper in paper mills and printing plants.

The adhesive tape of the type shown in Fig. 1 may have any suitable backing, such as cellophane, metal foil, paper or cloth. When the tape is to be wound directly in roll form without the use of a liner, the back surface of the backing should have a coating to which the adhesive does not aggressively adhere, such as a polyethylene coating. Other examples of suitable coatings are the hydrophobic low-adhesion polymers described in U. S. Patents Nos. 2,532,011 (Nov. 28, 1950) and 2,607,711 (Aug. 19, 1952). The strength of film-backed tapes can be increased by embedding a rope-fibre tissue paper, or cloth, or non-woven rayon or glass filaments in the adhesive layer. A high-strength bundling tape can be provided, for example, in which a layer of linearly-aligned rayon-filament yarns is embedded in the adhesive layer so as to produce a tape having a lengthwise tensile strength of about 180 lbs. per inch width; a suitable backing being a cellophane film having a hydrophobic backsizing of the type described in the aforesaid patents. Such tape has been found useful as a lumber bundling tape, being employed, for instance, in bundling lumber prior to treatment with a wood preservative solution. These solutions contain solvents that dissolve or soften the conventional water-insoluble rubber-base adhesives of regular pressure-sensitive adhesive tapes, and when the tape is subsequently removed from the lumber a deposit of water-insoluble adhesive is left on the wood which is difficult to eliminate. The present type of tape utilizes an adhesive which is not attacked by the solvent, and if any residue of adhesive is left on the wood it can be readily removed if desired by wiping with a damp rag.

A particularly important embodiment of the present invention is in providing double-coating splicing tapes to be used for splicing webs of paper in printing plants and paper mills. By "double-coated" it is meant that both faces of the tape carry the adhesive, so that the tape can be applied to the butt end of one web of paper and then the tip portion of the other web of paper can be overlapped to provide a splice. The present tape instantly bonds to the paper webs and provides an immediate dry union. This is a valuable feature owing to the desirability of making high-speed splices.

The double-coated adhesive tape (as shown in Fig. 2) can be fabricated by saturating and coating a short-fibred porous tissue paper, which serves as the internal support for the adhesive coatings. A feature of the present water-soluble adhesive composition is that it can be applied as a solution in a volatile organic solvent, such as methanol, so as to avoid subjecting the tissue paper to water. Evaporation of the solvent leaves the tissue impregnated and double-coated with the dry but tacky adhesive. The adhesive webs can be slit into tapes of desired width, which are wound into rolls with a suitable liner, such as a film of polyethylene or a paper coated on both faces with polyethylene, to prevent bonding together of adjacent convolutions of the adhesive tape.

An outstanding virtue of this novel splicing tape is that it is water-disintegratable and the adhesive is soluble in water. Large printing plants accumulate a great amount of spliced paper that has gone through the presses and has then been cut out so as not to be included in the printed matter sent to the customer. Some of the splices are made at the paper mill, and some are made in the printing plant when changing rolls of paper. This spliced paper has a much higher salvage value if it can be repulped in a paper mill and included in the furnish employed in making new paper. The present splicing tape permits of this since the tissue paper base readily disintegrates and redisperses in the paper-making process, and the adhesive dissolves in the water and is of a kind and in such minute proportion that it has no adverse effect. In contrast, water-insoluble rubber-base pressure-sensitive adhesives, if used, not only seal the tissue paper fibers so that they cannot easily be redispersed, but the adhesive does not dissolve or completely disperse and appears in the paper product as small specks of foreign matter. Moreover, these rubber-resin or rubbery base adhesive particles cannot be eliminated from waste paper even by subjecting it to the drastic caustic soda and chlorination processes employed for "deinking" waste paper salvage.

My novel water-soluble adhesive composition consists essentially of a homogeneous blend of (A) a solid water-soluble polyvinyl carboxylic acid and (B) a compatible hydroxy-polyalkylene permanent elasticizer, in relative proportions such that the adhesive in dry form is aggressively tacky and has elastic cohesive strength.

This adhesive mixture retains the components in their water-soluble state. It is to be distinguished from reaction products resulting from chemical combination of such components to form water-insoluble alkyd resin esters, which products are chemically and physically different from my product and incapable of the same usage.

A dry layer of the adhesive aggressively adheres to paper when pressed thereagainst, and exhibits aggressive tackiness toward paper and other materials having a hydrophilic surface. The dry adhesive has high internal strength or cohesiveness and is elastic or rubbery in nature, and hence is described as having elastic cohesive strength. It is flexible and it can be peeled from a smooth surface, such as a glass surface, without splitting, owing to its elastic cohesive nature; in contrast to adhesives that are soft or gooey, or are hard or brittle.

An adhesive solution for coating can be readily prepared by dissolving the above-mentioned components in water or in a volatile hydroxylated water-soluble organic solvent, such as methanol or similar alcohol, serving as a volatile solvent vehicle and being in proportion to provide a suitable coating viscosity. The ingredients can be mixed together at room temperature to provide the desired adhesive solution.

A preferred example of the polyvinyl carboxylic acid component (A), is polyacrylic acid. This is a high-molecular weight polymer and is obtained as a white powder resembling starch. Another example is a 50/50 copolymer of polyvinyl methyl ether and maleic anhydride, having an average of two carboxylic acid groups (—COOH) after hydrolysis in each copolymer unit of the polymer chain structure. Still another example is the half-ester of this copolymer, in which substantially half of the carboxylic acid groups have been esterified by reaction with methyl or ethyl alcohol to provide methyl or ethyl ester groups.

Preferred examples of the hydroxy-polyalkylene elasticizer component (B) are poly-ethylene glycol and poly-propylene glycol of about 1,000 and about 400 molecular weight, respectively. A further example of suitable hydroxy-polyalkylene compounds is 2-ethyl-1,3-hexanediol having the formula:

$$HO-CH_2CH(CH_2CH_3)CH(OH)CH_2CH_2CH_3$$

these high molecular weight hydroxylated compounds are water-soluble and are fully compatible with the aforesaid polyvinyl carboxylic acid compounds, and function as elasticizers to produce flexible elastic type blends of high internal strength, in contrast to those plasticizers which merely produce softening and plasticity. They are "permanent" type elasticizers, by which it is meant that they are substantially non-volatile and have a low degree of hygroscopicity. The vapor pressure at 20° C. is less than 0.01 mm. Hg. Continued exposure for 3 days of a thin layer to an atmosphere of 90% relative humidity results in the absorption of no more than 10% by weight of water. These factors are required in order that the dry adhesive stably retain its desired characteristics for substantial periods. A volatile compound would evaporate from the adhesive and cause loss of desired properties. A hygroscopic compound would cause undue absorption of water when the adhesive is exposed to humid atmospheres, thereby rendering it too soft, whereas in a dry atmosphere there would be a loss of water that would cause a marked change in properties of such a composition and a loss of tack. Glycerine is too hygroscopic and is unsuitable.

The preferred ratio of poly-ethylene glycol of 1000 molecular weight is 140 parts by weight per 100 parts of polyacrylic acid, but substantially lower and higher ratios can be used. The preferred ratio of poly-propylene glycol of 425 molecular weight is 160 parts per 100 parts of polyacrylic acid. An optimum ratio for each combination of components can readily be determined by trial tests on samples, and no simple rule of thumb can be given. For instance, a suitable ratio when 2-ethyl-1,3-hexanediol is used as the elasticizer is about 200 parts per 100 parts of polyacrylic acid, or per 100 parts of a 50/50 copolymer of polyvinylmethyl ether and maleic anhydride.

Increased internal strength at elevated temperatures can be obtained by including in the adhesive mixture a small proportion of a cross-linking compound that serves to "cure" the compounds by forming linkages between molecules and thereby stiffening the molecular gel structure and raising the softening temperature.

A preferred type thereof is provided by polyfunctional epoxy compounds, such as are obtained by reacting bis-phenol A and epichlorohydrin. The molecule includes epoxide groups which can react with carboxylic acid groups present in the polyvinyl carboxylic acid polymer molecules of the adhesive, and thereby provide linkages between the latter molecules. A preferred ratio is about 0.5 to 1.5 parts by weight of epoxy compound per 100 parts of polyacrylic acid. The cross-linking reaction should occur in the dry adhesive, and the epoxy compound should be added to the adhesive solution shortly before coating application. The adhesive coated tape material can be heated for 24 hours at 120° F. to cure the adhesive; however, curing at warm room temperature (80° F.) will be spontaneously completed in one month, and hence can be effected by merely storing the adhesive tape for that period in a warm room.

Splicing tapes having an adhesive cured by means of an epoxy compound (or equivalent cross-linking agent) are very desirable for use in splicing paper webs that are subjected to elevated temperatures, as in high-speed rotary printing presses equipped with ovens for rapid heat-set of printing inks. A sufficient internal cohesiveness is retained to assure against pulling apart or slippage of the splice under tension while passing through the oven.

The cured type of adhesive is rendered more resistant to water, but it will dissolve in water when mechanically agitated or mixed, as occurs when a splicing tape is subjected to repulping in a paper mill.

Example 1

A preferred adhesive coating composition is prepared by mixing together the following ingredients:

| | Parts by weight |
|---|---|
| Polyacrylic acid | 100 |
| Poly-ethylene glycol (mol. wt. of 1000) | 140 |
| Methanol | 300 |

This solution has a solids content of about 45% and has a suitable viscosity for readily saturating and coating tissue paper. Splicing tape was made by passing a web of tissue paper through a bath of the adhesive solution and then through an orifice to provide a coating weight of 810 grains per square yard (dry solids basis). The wet web was laminated to a thin polyethylene film and dried. The composite web was slit and wound into rolls of tape, the polyethylene liner being on the outside.

In applying the tape, it is unwound from the roll and a strip of appropriate length is pressed against the surface of the paper. The liner is peeled off and then the second paper is pressed against the exposed adhesive surface, resulting in a firm splice between the papers.

Splicing tape made in this way has been tested under a variety of commercial usages and found satisfactory under conditions not involving tension of the splice at elevated temperatures.

Example 2

The following is a modified formula useful for making splicing tapes that are resistant to elevated temperatures.

| | Parts by weight |
|---|---|
| Polyacrylic acid | 100 |
| Poly-propylene glycol (mol. wt. of 425) | 160 |
| Methanol | 320 |
| Epoxy curing agent | 0.6 |

The epoxy compound, a curing agent which serves to impart increased gel strength to the adhesive and which elevates the softening temperature, is added to the solution shortly before it is used. Curing is effected by heating the adhesive coated tissue paper for 24 hours at 120° F. A preferred example is a resorcinol diglycidyl ether made from rescorcinol and epichlorohydrin in the presence of aqueous caustic soda, having an epoxy equivalent value of about 150. Another example is a diglycidyl ether of diethylene glycol, prepared in a similar way from diethylene glycol and epichlorohydrin, having an epoxy equivalent value of about 135. The epoxy equivalent is the weight in grams which contains 16 grams of oxirane oxygen (this being the oxygen contained in the epoxy rings).

Splicing tape of this type has been employed with complete success for splicing the paper webs passing through high speed rotary printing presses equipped with ovens for fast heat-setting of the printing inks. The splice does not slip even at temperatures which scorch the paper.

Example 3

This example illustrates the preparation of a preferred aqueous solution of the adhesive composition.

An aqueous solution of polyacrylic acid is prepared in a glass-lined kettle by polymerizing acrylic acid in water solution, employing potassium persulfate as the catalyst, so as to obtain a product solution containing about 17% solids and having a Brookfield viscosity in the range of 5,000 to 100,000 cps. at 80° F. Addition is made of approximately 0.272 part by weight of poly-propylene glycol (mol. wt. of 425) to each part by weight of the polyacrylic acid solution, with constant stirring at room temperature. Then 0.0035 part by weight of hexamethylene diamine (as a 70% solution in water) per part by weight of the polyacrylic acid solution, is slowly added with continued mixing to neutralize the sulfuric acid that is present as the result of decomposition of the potassium persulfate catalyst during the aforesaid polymerization process. A dye (such as Malachite Green) may be included, if desired, so that coatings of the adhesive will be colored and thereby be made more readily visible.

This aqueous adhesive solution contains an unreacted mixture of poly-propylene glycol and polyacrylic acid in a weight ratio of approximately 160:100. The total adhesive solids constitute about 34% by weight of the solution.

Adhesive coatings formed by applying this aqueous solution to base surfaces and drying, have good internal strength at elevated temperatures without the need of employing a cross-linking agent and, not having been cured thereby, retain the property of readily dispersing in water.

The adhesive can be cast by coating the solution on a polyethylene film, or on a paper coated with polyethylene, or other suitable liner, and drying. The dried adhesive coating can be transferred to another surface by pressing the exposed tacky adhesive surface thereagainst and peeling off the liner, thereby exposing the tacky adhesive surface that was initially in contact with the liner. Double-coated adhesive tape can be made in this manner by transferring a dried layer of the adhesive to each face of a film, paper or cloth support, one liner being temporarily retained if desired to permit of widing the tape in roll form. The aforesaid splicing tapes having a tissue paper support can be made in this manner, thereby avoiding subjecting the tissue paper to the aqueous adhesive solution.

I claim:

1. An adhesive tape having a dry layer of normally tacky water-soluble adhesive that aggressively adheres to paper when pressed thereagainst and consists essentially of a homogeneous blend of a solid water-soluble polyvinyl carboxylic acid and a compatible hydroxy-polyalkylene permanent elasticizer in relative proportions such that the adhesive is aggressively tacky and has elastic cohesive strength.

2. An article according to claim 1 wherein the adhesive consists essentially of 100 parts by weight of polyacrylic acid and about 160 parts of poly-propylene glycol.

3. An article according to claim 1 wherein the adhesive is cured with a small proportion of admixed cross-linking agent that increases the cohesive strength of the adhesive at elevated temperatures.

4. An article according to claim 1 wherein the adhesive consists essentially of 100 parts by weight of polyacrylic acid and about 160 parts of poly-propylene glycol, and is cured with a small proportion of admixed epoxy curing agent which imparts improved heat resistance.

5. A splicing tape comprising a tissue paper impregnated and coated on both faces with a dry, normally tacky, water-soluble adhesive that aggressively adheres to paper when pressed thereagainst and consists essentially of a homogeneous blend of polyacrylic acid and a compatible hydroxy-polyalkylene permanent elasticizer in proportions such that the adhesive is aggressively tacky and has elastic cohesive strength.

6. A water-soluble adhesive composition which in dry form is normally tacky and aggressively adheres to paper when pressed thereagainst and consists essentially of a homogeneous blend of a solid water-soluble polyvinyl carboxylic acid and a compatible hydroxy-polyalkylene permanent elasticizer in relative proportions such that the dry adhesive is aggressively tacky and has elastic cohesive strength.

7. An adhesive composition according to claim 6 which includes a small proportion of a cross-linking agent that increases the cohesive strength of the adhesive at elevated temperatures.

8. A methanol solution of the adhesive composition of claim 6.

9. An aqueous solution of the adhesive composition of claim 6.

10. An adhesive composition according to claim 6 which consists essentially of a mixture of 100 parts by weight of polyacrylic acid and about 160 parts of polypropylene glycol.

11. An adhesive composition according to claim 6 which consists essentially of a mixture of 100 parts by weight of polyacrylic acid and about 160 parts of polypropylene glycol, and a small proportion of epoxy curing agent which imparts improved heat resistance.

References Cited in the file of this patent

UNITED STATES PATENTS

| | | |
|---|---|---|
| 2,438,195 | Tierney | Mar. 23, 1948 |
| 2,445,553 | Beavers | July 20, 1948 |
| 2,524,921 | Minter | Oct. 10, 1950 |
| 2,532,011 | Dahlquist et al. | Nov. 28, 1950 |
| 2,595,952 | Kunze | May 6, 1952 |
| 2,607,711 | Hendricks | Aug. 19, 1952 |
| 2,607,761 | Seymour | Aug. 19, 1952 |
| 2,648,617 | Hanson | Aug. 11, 1953 |
| 2,683,131 | Cass | July 6, 1954 |

FOREIGN PATENTS

| | | |
|---|---|---|
| 450,455 | Great Britain | July 15, 1936 |
| 693,915 | Great Britain | July 18, 1953 |
| 145,049 | Australia | Feb. 8, 1952 |